(12) United States Patent
Boyens et al.

(10) Patent No.: US 8,958,816 B2
(45) Date of Patent: Feb. 17, 2015

(54) LOCALIZATION OF A WIRELESS COMMUNICATION DEVICE

(75) Inventors: Birger Boyens, Husum (DE); Amadeus Podvratnik, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 13/292,313

(22) Filed: Nov. 9, 2011

(65) Prior Publication Data

US 2012/0142370 A1    Jun. 7, 2012

(30) Foreign Application Priority Data

Dec. 2, 2010  (EP) .................................... 10193450

(51) Int. Cl.
*H04W 24/00*  (2009.01)
*H04W 64/00*  (2009.01)

(52) U.S. Cl.
CPC ...................................... *H04W 64/00* (2013.01)
USPC ..................... 455/456.1; 455/414.1; 455/45.2; 455/445; 455/417; 455/432.1; 455/459; 455/456.2; 455/458

(58) Field of Classification Search
CPC ................. H04M 2203/1091; H04M 3/42357; H04M 3/42374; H04W 4/16; H04W 88/06; H04W 4/023; H04W 64/00; A01K 15/023
USPC .......... 455/404.2, 456.1, 452.1, 456.5, 435.1, 455/456.3, 466, 456.6, 445, 569.2, 420, 455/432.1, 434
See application file for complete search history.

(56) References Cited

U.S. PATENT DOCUMENTS

| | | | |
|---|---|---|---|
| 7,720,488 B2 | 5/2010 | Feher | |
| 7,751,829 B2 | 7/2010 | Masuoka et al. | |
| 7,764,231 B1 | 7/2010 | Karr et al. | |
| 2008/0076449 A1* | 3/2008 | Joo | ............................ 455/456.1 |
| 2009/0160603 A1 | 6/2009 | Bauchot et al. | |
| 2010/0066503 A1 | 3/2010 | Rhie et al. | |

FOREIGN PATENT DOCUMENTS

WO    WO2008048059 A1    8/2008

OTHER PUBLICATIONS

A. M. Parmer, Location Detection Using RFID, [online]; [retrieved on Aug. 19, 2010]; retrieved from the Internet http://gradworks.umi.com;14/72/1472242.html.
R. Resoriero et al., "A Location-aware System using RFID and Mobile Devices for Art Museums," Fourth International Conference on Autonomic and Autonomous Systems, Mar. 16-18, 2008, pp. 76-81.

\* cited by examiner

*Primary Examiner* — Joseph Arevalo
(74) *Attorney, Agent, or Firm* — Cantor Colburn LLP

(57) ABSTRACT

A method, computer program product and system for improving the localization of a wireless communication device within an area covered by a transceiver infrastructure includes triggering the wireless communication device to emit a positioning signal. A positioning signal is received from the wireless communication device by a further wireless communication device at a known position within the area covered by the transceiver infrastructure. The transceiver infrastructure includes at least three transceivers. A forwarding positioning signal is transmitted from the further wireless communication device to at least one of the transceivers. The wireless communication device is located based on the forwarding positioning signal.

16 Claims, 7 Drawing Sheets

LOCALIZATION OF A WIRELESS COMMUNICATION DEVICE

PRIORITY

This application claims priority to European Patent Application No. 10193450.3, filed Dec. 2, 2010, and all the benefits accruing therefrom under 35 U.S.C. §119, the contents of which are herein incorporated by reference in its entirety.

BACKGROUND

The present invention generally relates to wireless communication devices, and more specifically, to improving the localization of wireless communication devices.

There has been an increasing demand for reliably locating wireless communication devices. In some cases, the wireless communication devices themselves need to be located, e.g., for maintaining a connection to a communication network, and in other cases, the wireless communication devices are attached to items which need to be located. Similarly, it can also be desired to locate the position of a person carrying a wireless communication device. Different applications based on location information are already available. Such location based services include securing or tracking access to specific areas, or to providing information related to the current location of a person using the wireless communication device.

Different technologies are used in the art for locating wireless communication devices. These technologies depend also on the kind of communication technology used in the wireless communication device and the transceiver infrastructure. The common concept of locating a device is based on triangulation, which requires a set of at least three transceivers to receive a signal from the wireless communication device to be located in order to determine a three dimensional (3D) position. Depending on the triangulation technology that is used, a set of four transceivers may be the minimum number of required transceivers.

Triangulation can be used independently from the underlying communication technology and can be applied to ultrasonic, optical or radio communication technologies including: wireless local area networks (LANs) (e.g., wireless LANs or "WLANs", and wireless fidelity or "WIFI"), Bluetooth technology and Radio Frequency Identification (RFID). When receiving the signal from the wireless communication device, different measurements like the time of arrival (TOA) of the signal at the different transceivers, the time difference of arrival (TDOA), an angle of arrival (AOA) and/or a received signal strength indicator (RSSI) can be used to locate a wireless communication device by means of triangulation.

Reliably determining the position of a wireless communication device depends on the provided transceiver infrastructure. The transceivers have to be located to cover the whole area in a way so that from each point of the area, a signal from the wireless communication device to be located can be received by at least three transceivers. This is rather simple in plane territory but can be complicated in areas having obstacles therein, e.g., mountains, bridges, houses, or when talking about smaller areas, obstacles like walls, persons or whatever. These obstacles in general can, for example, absorb or reflect communication signals and limit the coverage of communication signals within the covered area. In the case of radio communication, especially obstacles made of metal can cause communication problems. In addition, emitters which are emitting within the covered area, can cause interference and thereby reduce the coverage within the area. These emitters can be other wireless communication devices sending similar signals, or any kind of other emitters which have emissions that can interfere with the communication between the wireless communication device and the transceivers. When the coverage is reduced, either the position of a wireless communication device cannot be determined at all or, as long as communication with at least a reduced number of transceivers is possible, the position is determined with reduced accuracy (also referred to as a margin of tolerance).

SUMMARY

According to exemplary embodiments, a method, computer program product, and system for improving the localization of a wireless communication device within an area covered by a transceiver infrastructure include triggering the wireless communication device to emit a positioning signal. A positioning signal is received from the wireless communication device by a further wireless communication device at a known position within the area covered by the transceiver infrastructure. The transceiver infrastructure includes at least three transceivers. A forwarding positioning signal is transmitted from the further wireless communication device to at least one of the transceivers. The wireless communication device is located based on the forwarding positioning signal.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

DETAILED DESCRIPTION

Figure 1:
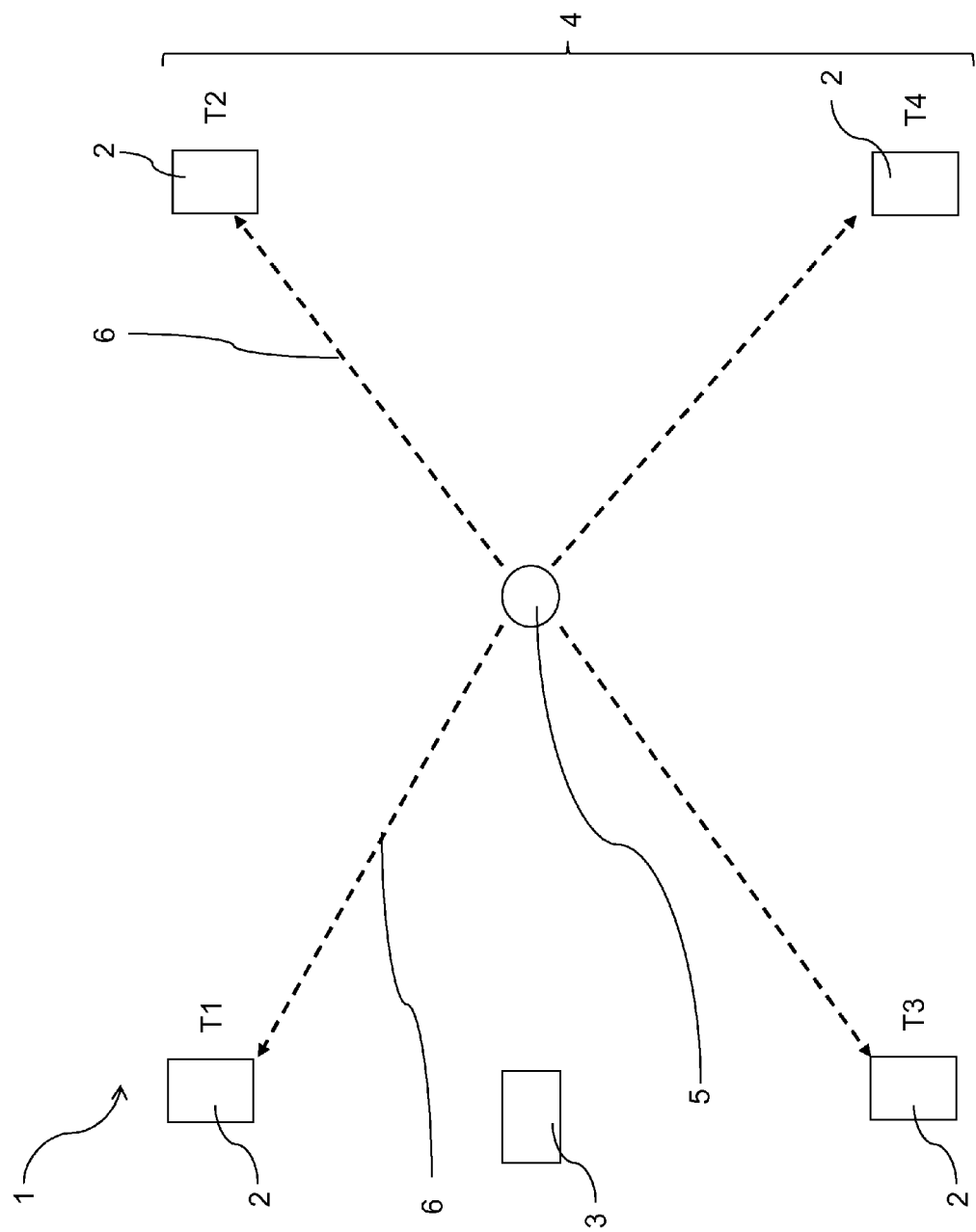
FIG. 1 shows a system that includes a transceiver infrastructure which covers an area, and a wireless communication device located therein, as a schematic top view.

Referring now to FIG. 1, a system that includes a transceiver infrastructure 1 in generally shown. The transceiver infrastructure 1 includes a set of four transceivers 2 which are arranged in the corners of a rectangle and are additionally denoted T1 to T4. The transceivers 2 of the transceiver infrastructure 1 are connected to a central control unit 3, which can be located at any place. The connection between the transceivers 2 and the central control unit 3 can be realized by any existing communication technology (e.g., cable, wireless). The square formed by the transceivers 2 defines an area 4, which is the area 4 covered by the transceiver infrastructure 1. In an embodiment, the central control unit 3 includes a storage device for storing a computer-usable program code and a processor for executing the computer-usable program.

Within the area 4 is located a single wireless communication device 5. Transceivers 2 and wireless communication devices 5 in this embodiment of the invention communicate, by way of example, using radio signals according to the Radio Frequency Identification (RFID) specification. Accordingly, the wireless communication devices 5 are called radio devices 5 and the communication signals that are used are called radio signals in the further description. Nevertheless, the communication can also be implemented by any suitable wireless communication technology based on radio signals, ultrasonic signals and/or optical signals.

The radio device 5 emits a positioning signal 6 to the transceivers 2. The radio signals, like the positioning signal 6 are indicated by arrows, although the transmission of the positioning signal 6 is not directed. The arrows are just used to indicate a flow of information. This applies to all signals used in the description.

The general concept for locating a radio device 5 is explained now based on FIG. 1.

The radio device 5 to be located transmits the positioning signal 6 when being triggered, e.g. by a trigger signal from one of the transceivers 2, which is not shown explicitly in FIG. 1. Further, the transceivers 2 and the radio devices 5 are synchronized to a common time base to allow a TOA or TDOA measurement of the positioning signal 6 at further radio devices 5 and the transceivers 2. The location of the radio device 5 to be located is determined by known means of triangulation based on the measurement of TOA, TDOA, an angle of arrival (AOA) and/or a received signal strength indicator (RSSI). These techniques are known in the art and not further explained.

Figure 2:
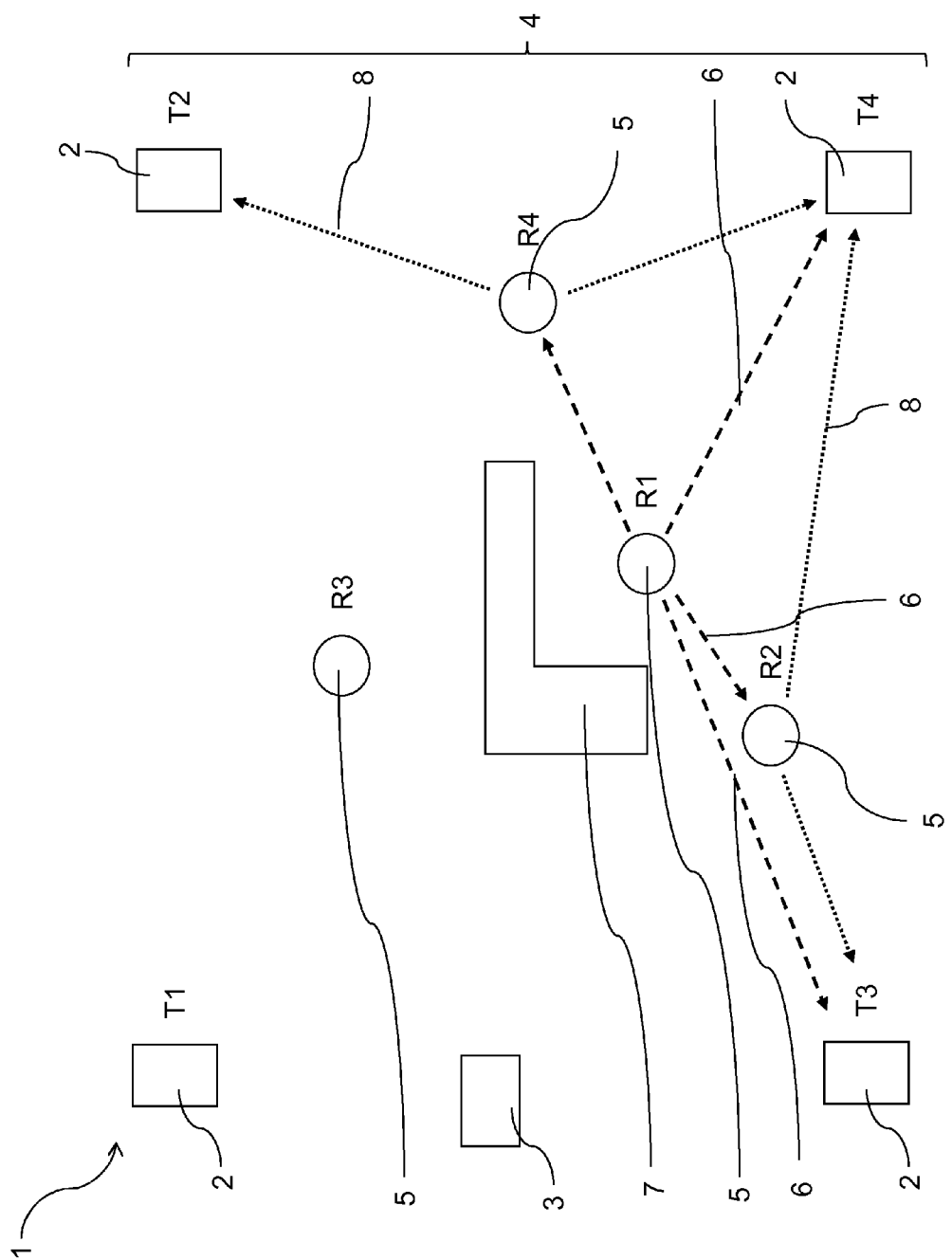
FIG. 2 shows the transceiver infrastructure of FIG. 1 with additional radio devices and an obstacle within the area.

Referring now to FIG. 2, a typical scenario of radio devices 5 and an obstacle 7 within the area 4 is shown. The transceiver infrastructure 1 is not changed compared to FIG. 1. For simplifying the description, the radio devices 5 in this figure are denoted by identifiers R1 to R4, which is not limiting the scope of embodiments of the invention. The radio device R1 is the radio device 5 to be located.

Transmissions from radio device R1 are in this example partially blocked by an obstacle 7, so that the positioning signal 6 from radio device R1 is only received at transceivers T3 and T4. This is not sufficient to determine the exact position of the radio device R1, since triangulation requires at least three measurement points. Further measurement points are defined in this scenario by radio devices R2 and R4, which also receive the positioning signal 6 from the radio device R1. Radio devices R2 and R4 perform a measurement according to the measurement performed by the transceivers 2 and transmit a forwarding positioning signal 8, which contains the result of this measurement and an identification of the radio device R1. As shown by way of example, the forwarding positioning signals 8 from the radio devices R2 and R4 are received each by two transceivers 2. The direct measurements of the positioning signal 6 of the radio device R1 by the transceivers T3, T4 together with the indirect measurements, as described above in respect to the radio devices R2, R4, sum to a total number of four measurements, which are available for determining the location of the radio device R1. The radio device R3, which is shown in FIG. 2 above the obstacle 7, does not receive the positioning signal 6 from the radio device R1 and accordingly does not transmit a forwarding positioning signal 8. The position of the radio device R1 is determined as described in respect to FIG. 1.

Figure 3:
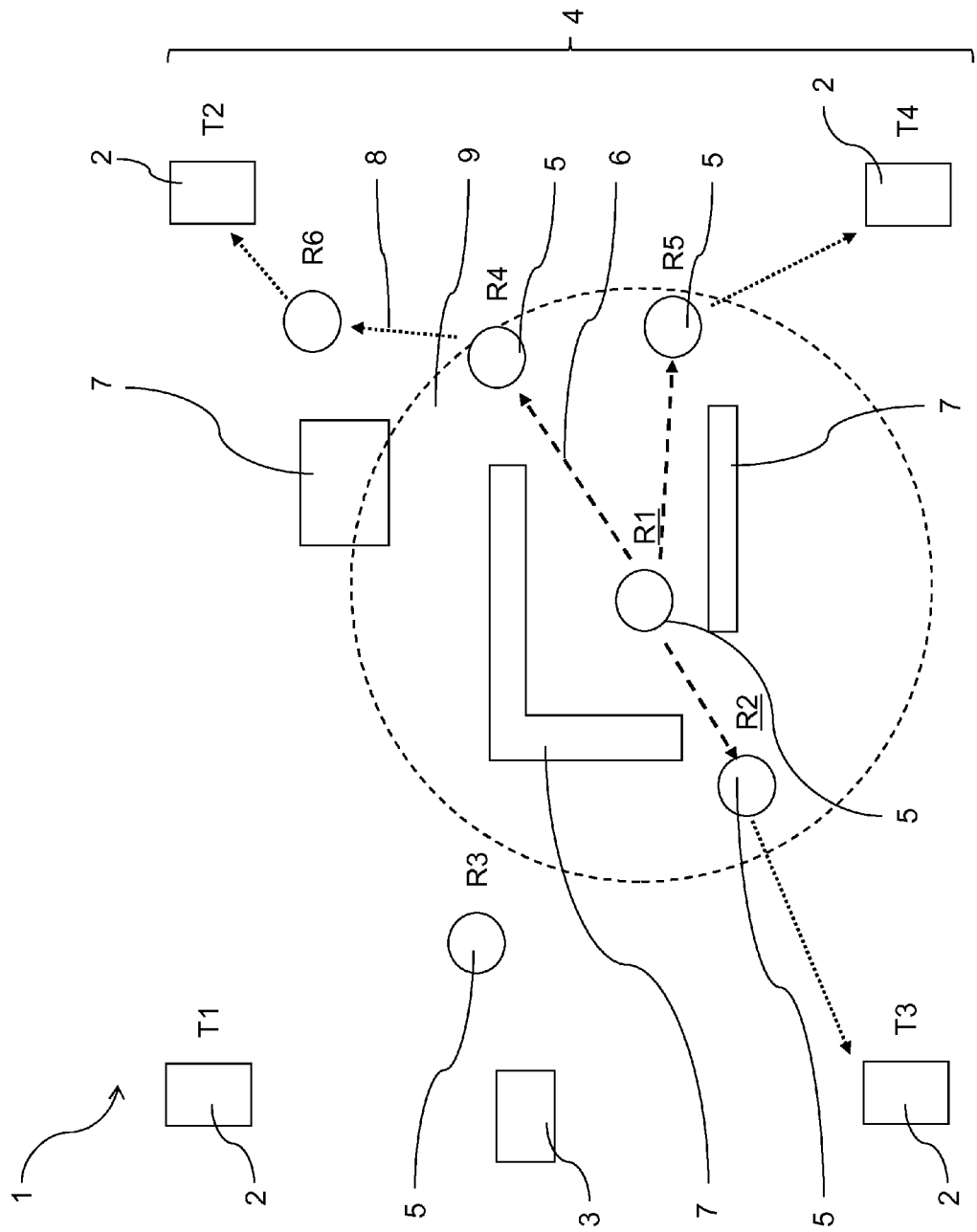
FIG. 3 shows the transceiver infrastructure according to FIG. 1 with further wireless communication devices and additional obstacles in the area.

Referring now to FIG. 3, the transceiver infrastructure 1 of FIG. 1 can be seen with six radio devices 5, which are denoted R1 to R6. Radio device R1 is again the radio device 5 to be located. Furthermore, also a set of three obstacles 7 is present within the area 4. The distribution of the radio devices 5 and the obstacles 7 is given just by way of example to explain the advantages of embodiments of the invention.

In the example shown in FIG. 3, the radio device R1 to be located is triggered to transmit the positioning signal 6 as already described with respect to FIG. 1. The positioning signal 6 from the radio device R1 to be located is blocked by the obstacles 7, so that it cannot be directly received at any of the transceivers 2. Accordingly, further radio devices R2, R4, R5, which are located within a circular search area 9 surrounding the radio device R1 to be located, are activated by the transceiver infrastructure. In this example, it is assumed that the radio device R1 did not move from a last known position, so that the circular search area 9 defines an activation area or search area around the last known position. The further radio devices R2, R4, R5 are activated and in this example receive the positioning signal 6 from the radio device R1 to be located. The further radio devices R2, R4, R5 perform a measurement according to the measurement performed by the transceivers 2, as explained above, and each transmit a forwarding positioning signal 8. The forwarding positioning signal 8 emitted from the further radio devices R2, R5 is received directly by the transceivers T3 and T4, respectively, whereas the further radio device R4 is not in direct contact with any of the transceivers 2. Hence, radio device R4 transmits the forwarding positioning signal 8, which is received by another further radio device R6, which then forwards the forwarding position signal 8, so that it is received by transceiver T2. This way, the position of the radio device R1 to be located can be determined by means of measurements performed by radio devices R2, R4, R5 in the proximity of R1, which have a known position within the area 4, without a measurement performed directly by any of the transceivers 2.

Figure 4:
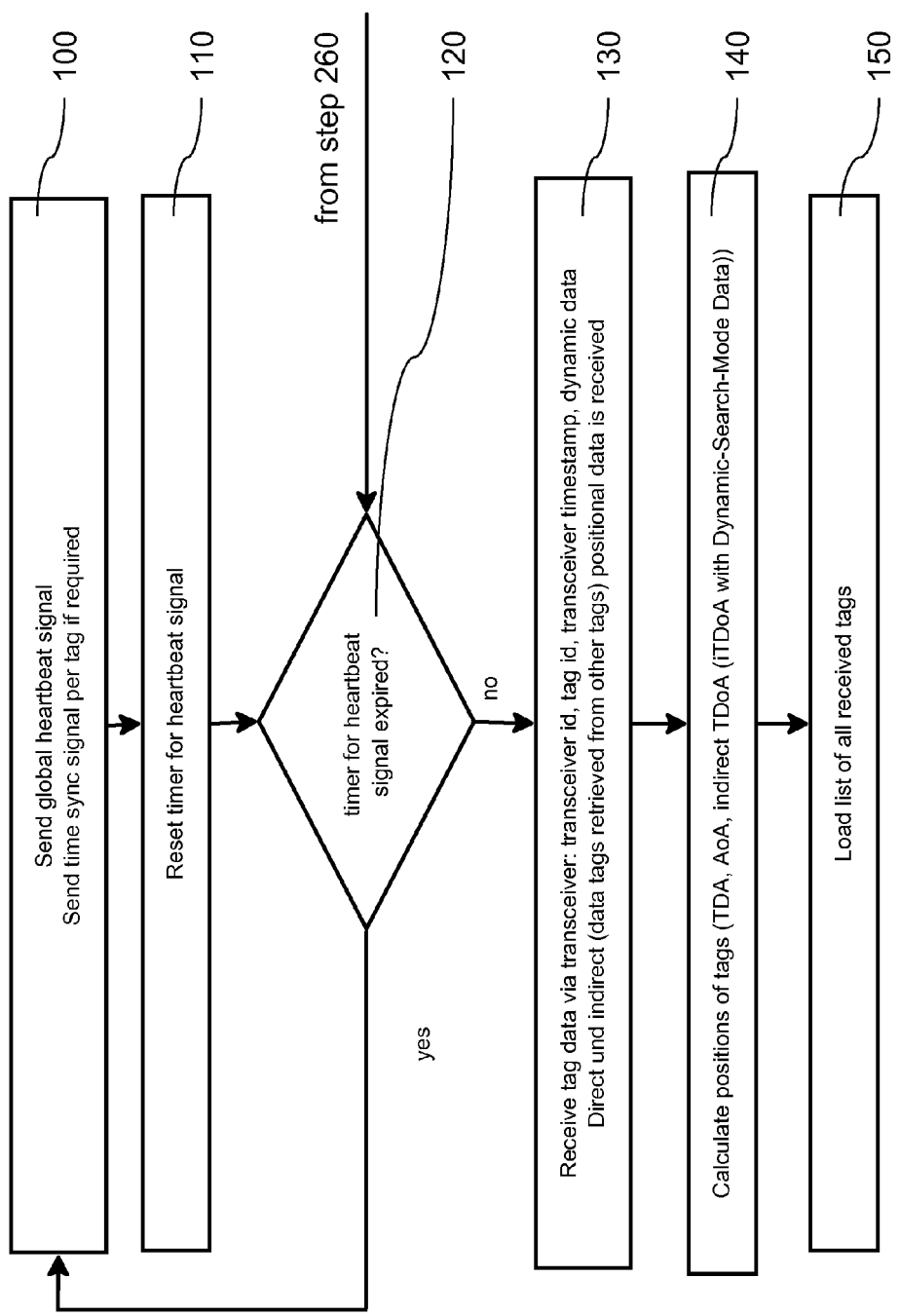
FIG. 4 shows a first part of a flowchart of an implementation of the method in the transceiver infrastructure according to FIG. 1.
Figure 5:
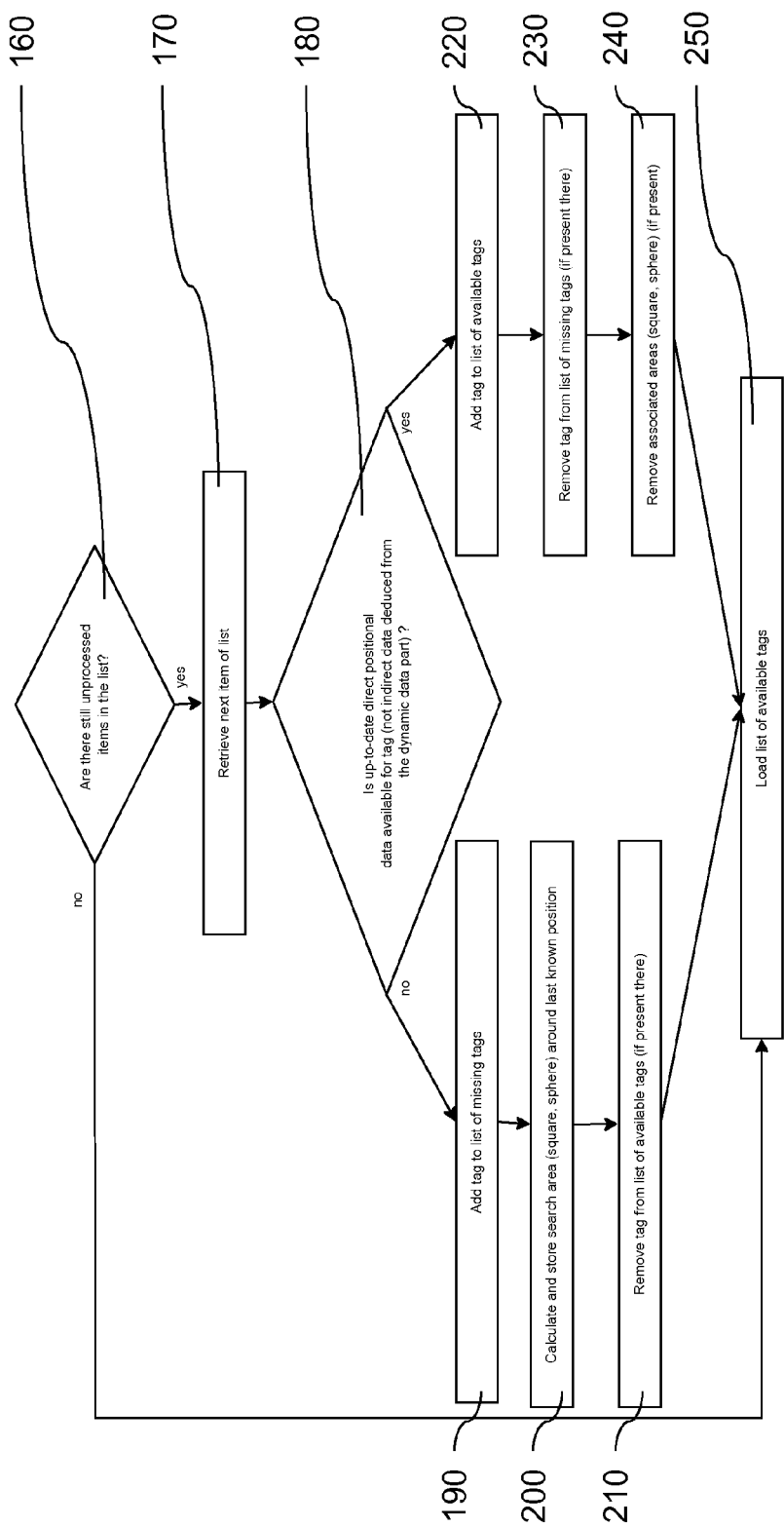
FIG. 5 shows a second part of a flowchart of an implementation of the method in the transceiver infrastructure according to FIG. 1.
Figure 6:
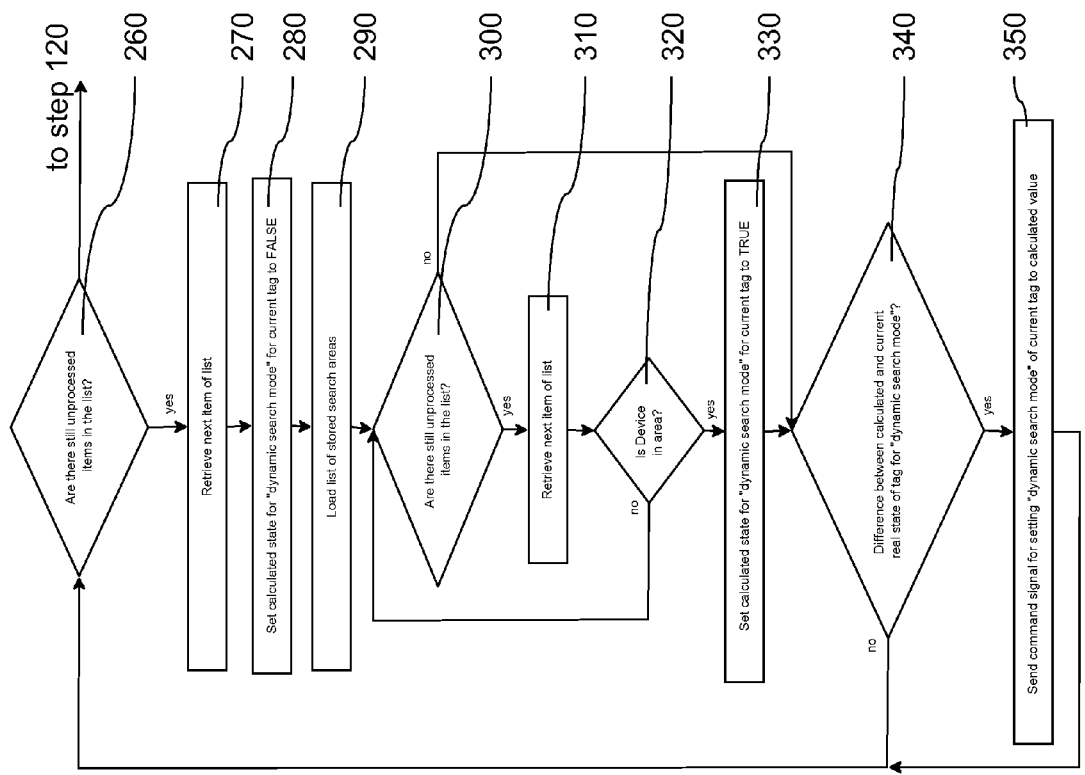
FIG. 6 shows a third part of a flowchart of an implementation of the method in the transceiver infrastructure according to FIG. 1.

Referring now to FIGS. 4 to 6, a flowchart of an implementation of an embodiment of the method in the transceiver infrastructure 1 according to FIG. 1 is described. The implementation is based on RFID, so that radio devices 5 are called 'tags'.

At block 100, a global heartbeat signal is sent. This includes the transmission of a broadcast signal to all radio devices 5 in the area 4 as well as a transmission of an individual signal to each of the radio devices 5. This signal is used by a radio device 5 to determine that a connection to at least one of the transceivers 2 exists. Furthermore, a synchronization signal can be sent for all radio devices 5 if required. Transmission of each of the signals refers to emitting the signal by at least one of the transceivers 2. It is not excluded that the signals are further transmitted by radio devices 5 as described above.

At block 110, a timer for the heartbeat signal is started/reset, which is used to periodically transmit the heartbeat signal.

According to block 120, it is evaluated if the timer for the heartbeat signal has expired. In case the timer expired, the method continues with block 100, otherwise it continues with block 130.

In block 130, signals from the radio devices 5 are received. This includes reception of positioning signals 6 and the reception of forwarding positioning signals 8, as described above.

The signals 6, 8 include an identification of the respective radio device 5 which transmitted the signal 6, 8, and are provided with a timestamp and an identification of the transceiver 2, which received the signal 6, 8.

The measurements, direct and indirect, are evaluated in block 140 to determine the position of each radio device 5.

According to block 150, a list of available radio devices, from which a signal has been received, is loaded.

Continuing with FIG. 5, in block 160 it is determined if there are still unprocessed items on the list. If there are not, block 250 is executed next, otherwise the method continues with block 170.

In block 170 the next item is retrieved from the list for further processing.

According to block 180, it is verified, if for the radio device 5, which is currently being processed (the item retrieved from the list for further processing at block 170), an up-to-date position is available. This refers only to a directly determined position by use of transceivers 2. If yes, block 190 is executed, otherwise block 220 is executed.

In block 190, the radio device 5 is added to a list of missing tags.

According to block 200, a search area 9 based on the last known position of the respective radio device 5 is calculated and stored.

At block 210, the radio device 5 is removed from a list of available tags, in case it was present in this list. Next, the method continues with block 250.

According to the verification in block 180, in block 220 the radio device 5 is added to a list of available tags.

Furthermore, in block 230 the radio device 5 is removed from a list of missing tags, in case it was present in this list.

Also an associated area, i.e. a search area 9, is removed in block 240, in case it was defined.

According to block 250, the list of available tags is loaded for further processing.

Now continuing with FIG. 6, in block 260 it is verified if there are still unprocessed items in the list. If not, the method returns to block 120.

In block 270 the next item from the list is retrieved for further processing.

Next, according to block 280, a flag, indicating whether dynamic search mode has been calculated, is set to FALSE for the current radio device 5.

Subsequently, a list of stored search areas 9 is loaded in block 290 for further processing.

In block 300 it is evaluated if there are still unprocessed items on the list. If not, the method continues with block 340.

If there are unprocessed items on the list, the processing continues at block 310 where the next item from the list is retrieved.

It is verified in block 320, if the device is within the respective search area 9 from the list. If not, further list are processed continuing with block 300. Otherwise, the method continues with block 330.

According to block 330, the flag indicating whether dynamic search mode has been calculated, is set to TRUE for the current radio device 5.

In block 340 it is verified, if there is a difference for the current radio device 5 between the calculated and a real state of the radio device 5 regarding dynamic search mode. If not, the method continues with block 260. Otherwise, the method continues with block 350.

In block 350, a command is sent to the respective radio device 5 to set the dynamic search mode in the radio device 5 to the calculated value. This includes direct transmission from a transceiver 2, or forwarding the signal via further radio devices 5 as described above in respect to the positioning signal 6 or the trigger signal.

Figure 7:
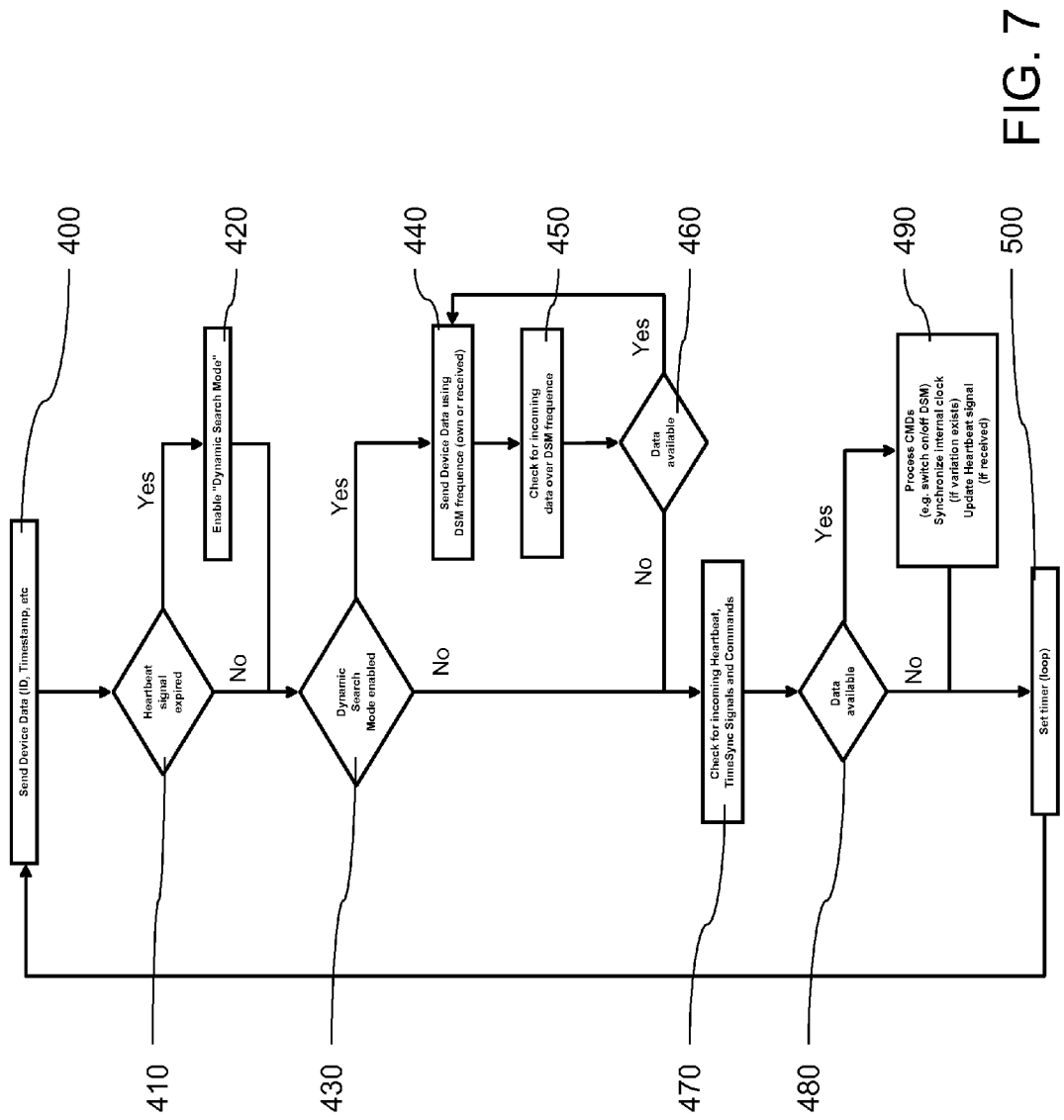
FIG. 7 shows a flowchart of an implementation of the method in respect to the wireless communication device.

With respect to FIG. 7, an exemplary embodiment of an implementation of the method in respect to the radio device 5 is discussed in detail based on the provided flow chart.

At block 400, the radio device 5 transmits the positioning signal 6, which contains among others an identification of the radio device 5 and a time stamp.

In block 410, the radio device 5 verifies if the heartbeat signal from the transceiver 2 expired, i.e. if a timeout for reception of the signal from one of the transceivers 2 occurred. As stated above in respect to block 100, this includes determining whether the heartbeat signal was received as a forwarded signal from any further radio device 5. If not, the method continues with block 430, otherwise with block 420.

According to block 420, the dynamic search mode is activated in the radio device 5.

In block 430, the radio device verifies if it has the dynamic search mode enabled. If the dynamic search mode is enabled, the process continues with block 440, otherwise it continuous directly with block 470.

In block 440, the radio device 5 initiates the transmission of a positioning signal 6. In this embodiment, a different frequency, the dynamic search mode (DSM) frequency, is used. This enables the use of a dedicated frequency for transmissions in DSM so that all radio devices 5 know receiving a signal on this frequency know that it has to be forwarded.

In block 450, the radio device 5 verifies if data was received on the DSM which means a positioning signal 6 or a forwarding positioning signal 8 from any other radio device 5 or a signal, e.g. a trigger signal or a command signal transmitted from one of the transceivers 2 as forwarded signal from further radio devices 5.

In block 460 it is evaluated, if data is available. If yes, the radio device 5 returns to block 440 for forwarding signals, which are not originated from the radio device 5, i.e., the radio device 5 forwards the signal, either to be received by a further radio device 5 or by a transceiver 2. If no data has been received, the method continuous with block 470.

In block 470, the radio device 5 verifies if signals were received, which were directed to the radio device 5 from one of the transceivers 2 directly, e.g. a trigger signal, a synchronization signal or a command signal.

In block 480 it is determined if data is available. In the case where data is available, the method continuous with block 490. If no data is available, the method continues directly with block 500.

According to block 490, the radio device 5 processes the received data, which means that, e.g., the DSM is switched on or off or the internal clock is synchronized. Furthermore, the received data indicates that communication with the transceiver infrastructure 1 exists and the timer for reception of the heartbeat is reset.

In block 500, the radio device 5 sets a timer, which enables a periodic transmission of the positioning signal 6. The method then returns to block 400.

An embodiment of the present invention is directed to forwarding a positioning signal from a wireless communication device to be located, via at least one other wireless communication device to at least one transceiver. When the other wireless communication devices (referred to herein as a further wireless communication device) has a known position, it provides a measurement similar to the transceivers, so that triangulation can be based on the location of the further wireless communication device and the measurement result.

The further wireless communication device performs the measurement of the received positioning signal in a manner similar to the transceivers. Triggering the wireless communication device to be located can be realized by different ways, e.g., by sending a trigger signal to the wireless communication device or by expiry of an internal timer of the wireless communication device.

For the triangulation, it does not matter whether only one of the measurements is performed by a further wireless communication device or whether all of the measurements are performed by further wireless communication devices, as long as the positions of the further wireless communication devices are known. Accordingly, embodiments can help to reliably locate devices, which due to the temporary presence of obstacles, are not in range of at least one of the transceivers. Furthermore, it is no longer required that the transceiver infrastructure be designed with a margin of tolerance for temporary communication link problems. Also, failure of one or even more transceivers may be compensated. Depending on the availability of further wireless communication devices, even one working transceiver may be sufficient for reliably localizing the wireless communication device.

Another advantage of embodiments described herein is that a transceiver infrastructure may be designed in a way that the covered area cannot be covered by the transceivers directly, but relies on the presence of further wireless communication devices. Depending on the use case of the transceiver infrastructure (e.g. in cases where the presence of multiple further wireless communication devices can be assumed as given, even though their exact position cannot be predicted at the moment of design of the transceiver infrastructure) the probability of further wireless communication devices being close to part of the area not directly covered by the transceivers is evaluated when designing the transceiver infrastructure. A further advantage of embodiments of the present invention is that by adding measurements of further wireless communication devices within the area, the position of the wireless communication device to be located is determined with a high accuracy. In general, the accuracy is increased with the number of measurements used for determining the location.

Transmitting a forwarding positioning signal from the further wireless communication device to at least one of the transceivers includes transmitting the forwarding positioning signal to another further wireless communication device and transmitting the forwarding positioning signal from the another further wireless communication device to at least one of the transceivers. In this manner, a cascade of further wireless communication devices may be used to transmit the forwarding position signal to at least one of the transceivers. It is only required that the forwarding positional signal contains an information regarding the wireless communication device which received the positioning signal from the wireless communication device to be located, together with the measurement of this further wireless communication device.

In an embodiment, all wireless communication devices located within the area covered by the transceiver infrastructure are synchronized to a common time base. Synchronization to a common time base allows for accurate time measurements, e.g. to measure a time of arrival (TOA) or a time difference of arrival (TDOA) of the positioning signal to be received by the transceivers and/or the further wireless communication devices. It also allows a measurement of TOA and/or TDOA at the wireless communication device to be located so that the wireless communication device to be located can perform these measurements when receiving signals from the transceivers and/or a further wireless communication device and report these measurements in the positioning signal. For example, a transceiver can transmit with a transmit power above the maximum transmit power of the wireless communication device and the further wireless communication devices can be used as simple relay stations for forwarding the response of the wireless communication device to be located. Thus, the further wireless communication device can have a simple structure and relatively inexpensive. Synchronization also enables assignments of time slots for transmitting signals (e.g. the positioning signal) so that the transmission of this signal can be triggered by expiry of a timeout.

In a further embodiment, triggering the wireless communication device to be located includes transmitting a trigger signal from at least one of the transceivers to the wireless communication device to be located. The trigger signal may be sent individually to a single wireless communication device to be located or as a broadcast to multiple wireless communication devices to be located. The trigger signal may also be sent periodically to update the position of wireless communication devices. This allows a continuous tracking of the position of all wireless communication devices within the area. The transmit power may be chosen to be above the maximum transmit power of the wireless communication devices to increase the probability of reception of this signal.

The further wireless communication device(s) may be activated prior to receiving the positioning signal from the wireless communication device to be located, in accordance with an embodiment. Accordingly, each further wireless communication device is explicitly activated to forward the positioning signal of the wireless communication device to be located. This helps to limit the traffic of communication signals within the area and allows an efficient use of communication resources, e.g. a frequency band in the case of radio communication. Especially for wireless communication devices which are operated by battery, limiting communication traffic reduces power consumption and increases availability of the wireless communication devices. Activating a further wireless communication device can include deactivating the further wireless communication device after having forwarded the positioning signal from the wireless communication device to be located. In general, the activated wireless communication devices may be deactivated to reduce power consumption and communication traffic within the area, when they are no longer required.

Activating a further wireless communication device may include evaluating a last known position of the wireless communication device to be located and activating a further wireless communication device that is in proximity to the last known position of the wireless communication device to be located. The closer the activated wireless communication device is located to the last known position of the wireless communication device to be located, the higher is the probability of receiving the positioning signal from the wireless communication device to be located. Since the probability of receiving the positioning signal is high, no further wireless communication devices have to participate in locating the wireless communication device to be located, so that communication traffic is reduced and power consumption is lessened by having fewer active devices.

Additionally, activating a further wireless communication device may be based on zones, which are, for example, defined around a last known position of the wireless communication device to be located. Accordingly, all further wireless communication devices within such a zone will be activated to forward the positioning signal of the wireless communication device to be located. The zone may be limited, for example, by the range of transmission of the wireless communication device to be located, or to define a proximity around the last known position of the wireless communication device to be located.

In accordance with an embodiment, a trigger signal is transmitted periodically by at least one transceiver to trigger all wireless communication devices to transmit a positioning signal. This includes sending a broadcast trigger signal, which is a unique communication signal for all wireless communication devices within the area, or sending individual trigger signals to each of the wireless communication devices within the area. A wireless communication device within this area can measure the time from the last trigger signal and evaluate a timeout, which serves as a trigger to transmit the positioning signal. Furthermore, the wireless communication device to be located can also perform measurements on the trigger signal, e.g. to determine a change of received signal strength indicator, which implies a change in the position of the wireless communication device or the introduction of an obstacle within the area. Accordingly, an update of the position of the wireless communication device to be located is required, so that the wireless communication device to be located considers this as a trigger for transmitting the positioning signal.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for improving the localization of a wireless communication device within an area covered by a transceiver infrastructure that is controlled by a control unit, the method comprising:
    triggering the wireless communication device to emit a positioning signal;
    selecting a further wireless communication device from multiple wireless communication devices that receive positioning signals from other wireless communication devices and that report a list of other wireless communication devices from which a positioning signal has been received to at least one transceiver, the selecting based on their respective lists of other wireless communication devices;
    activating the further wireless communication device;
    receiving the positioning signal from the wireless communication device, the receiving by the further wireless communication device at a known position within the area covered by the transceiver infrastructure, the transceiver infrastructure comprising at least three transceivers that are connected to the control unit;
    transmitting a forwarding positioning signal from the further wireless communication device to at least one of the transceivers; and
    determining, by the control unit, a location of the wireless communication device responsive to the forwarding positioning signal.

2. The method of claim 1, wherein the transmitting a forwarding positioning signal from the further wireless communication device to at least one of the transceivers comprises transmitting the forwarding positioning signal to another further wireless communication device and transmitting the forwarding positioning signal from the another further wireless communication device to at least one of the transceivers.

3. The method of claim 1, wherein the transceivers, the wireless communication device and the further wireless communication device are synchronized to a common time base.

4. The method of claim 1, wherein the triggering the wireless communication device to emit a positioning signal comprises transmitting a trigger signal from at least one of the transceivers to the wireless communication device.

5. The method of claim 4, wherein the transmitting a trigger signal from at least one of the transceivers to the wireless communication device comprises transmitting the trigger signal to at least one another further wireless communication device, and transmitting a forwarding trigger signal from the at least one another further wireless communication device to trigger the wireless communication device to be located.

6. The method of claim 1, wherein the selecting comprises evaluating a last known position of the wireless communication device and the selecting the further wireless communication device is further based on the further wireless communication device being in proximity to the last known position of the wireless communication device.

7. The method of claim 1, wherein at least one additional further wireless communication device is activated in case the activated further wireless communication device does not receive the positioning signal from the wireless communication device.

8. The method of claim 1, wherein the transceivers, the wireless communication device, and the further wireless communication device transmit and receive radio signals, ultrasonic signals or optical signals.

9. A computer program product for improving the localization of a wireless communication device within an area covered by a transceiver infrastructure that is controlled by a control unit, the computer program product comprising:
    a non-transitory computer readable storage medium having computer readable code embodied therewith, the computer readable program code comprising:
    computer readable program code configured for:
    triggering the wireless communication device to emit a positioning signal;
    selecting a further wireless communication device from multiple wireless communication devices that receive positioning signals from other wireless communication devices and that report a list of other wireless communication devices from which a positioning signal has been received to at least one transceiver, the selecting based on their respective lists of other wireless communication devices;
    activating the further wireless communication device;
        receiving the positioning signal from the wireless communication device, the receiving by the further wireless communication device at a known position within the area covered by the transceiver infrastructure, the transceiver infrastructure comprising at least three transceivers that are connected to the control unit;
        transmitting a forwarding positioning signal from the further wireless communication device to at least one of the transceivers; and
        determining, by the control unit, a location of the wireless communication device responsive to the forwarding positioning signal.

10. The computer program product of claim 9, wherein the transmitting a forwarding positioning signal from the further wireless communication device to at least one of the transceivers comprises transmitting the forwarding positioning signal to another further wireless communication device and transmitting the forwarding positioning signal from the another further wireless communication device to at least one of the transceivers.

11. The computer program product of claim 9, wherein the transceivers, the wireless communication device and the further wireless communication device are synchronized to a common time base.

12. The computer program product of claim 9, wherein the triggering the wireless communication device to emit a positioning signal comprises transmitting a trigger signal from at least one of the transceivers to the wireless communication device.

13. The computer program product of claim 12, wherein the transmitting a trigger signal from at least one of the transceivers to the wireless communication device comprises transmitting the trigger signal to at least one another further wireless communication device, and transmitting a forwarding trigger signal from the at least one another further wireless communication device to trigger the wireless communication device to be located.

14. A system for improving the localization of a wireless communication device within an area covered by a transceiver infrastructure that includes at least three transceivers that are connected to a control unit that is configured for controlling the transceiver infrastructure, the system configured for:
- triggering the wireless communication device to emit a positioning signal, the wireless communication device within an area covered by the transceiver infrastructure;
- selecting a further wireless communication device from multiple wireless communication devices that receive positioning signals from other wireless communication devices and that report a list of other wireless communication devices from which a positioning signal has been received to at least one transceiver, the selecting based on their respective lists of other wireless communication devices;
- activating the further wireless communication device;
- receiving the positioning signal from the wireless communication device, the receiving by the further wireless communication device at a known position within the area covered by the transceiver infrastructure;
- transmitting a forwarding positioning signal from the further wireless communication device to at least one of the transceivers; and
- determining, by the control unit, a location of the wireless communication device responsive to the forwarding positioning signal.

15. The system of claim 14, wherein the transmitting a forwarding positioning signal from the further wireless communication device to at least one of the transceivers comprises transmitting the forwarding positioning signal to another further wireless communication device and transmitting the forwarding positioning signal from the another further wireless communication device to at least one of the transceivers.

16. The system of claim 14, wherein the transceivers, the wireless communication device, and the further wireless communication device transmit and receive radio signals, ultrasonic signals or optical signals.

* * * * *